(12) United States Patent
Heim

(10) Patent No.: US 7,140,228 B2
(45) Date of Patent: Nov. 28, 2006

(54) ROLLER BEARINGS EQUIPPED WITH SENSORS

(75) Inventor: Jens Heim, Schweinfurt (DE)

(73) Assignee: FAG Kugelfischer AG (DE)

( * ) Notice: Subject to any disclaimer, the term of this patent is extended or adjusted under 35 U.S.C. 154(b) by 0 days.

(21) Appl. No.: 10/511,063

(22) PCT Filed: Apr. 10, 2003

(86) PCT No.: PCT/DE03/01175

§ 371 (c)(1),
(2), (4) Date: Dec. 9, 2004

(87) PCT Pub. No.: WO03/087745

PCT Pub. Date: Oct. 23, 2003

(65) Prior Publication Data

US 2005/0081646 A1    Apr. 21, 2005

(30) Foreign Application Priority Data

Apr. 11, 2002  (DE) ................................ 102 15 929

(51) Int. Cl.
*G01N 3/00* (2006.01)
*G01L 1/00* (2006.01)

(52) U.S. Cl. ............................... 73/12.13; 73/862.322; 73/862.541; 73/862.55; 73/862.635

(58) Field of Classification Search ........... 73/862.322, 73/862.541, 862.55, 862.635
See application file for complete search history.

(56) References Cited

U.S. PATENT DOCUMENTS 5,952,587 A    9/1999  Browner et al. ....... 73/862.541

*Primary Examiner*—Edward Lefkowitz
*Assistant Examiner*—Freddie Kirkland, III
(74) *Attorney, Agent, or Firm*—Ostrolenk, Faber, Gerb & Soffen, LLP

(57) ABSTRACT

An antifriction bearing equipped with sensors for measuring the length change in the rolling contact between antifriction elements and the outer ring, region vectors are formed and pass via an interface to an evaluation unit disposed outside the antifriction bearing which add region vectors from the sensors in at least three regions and determines magnitude and direction of force on the bearing.

11 Claims, 1 Drawing Sheet

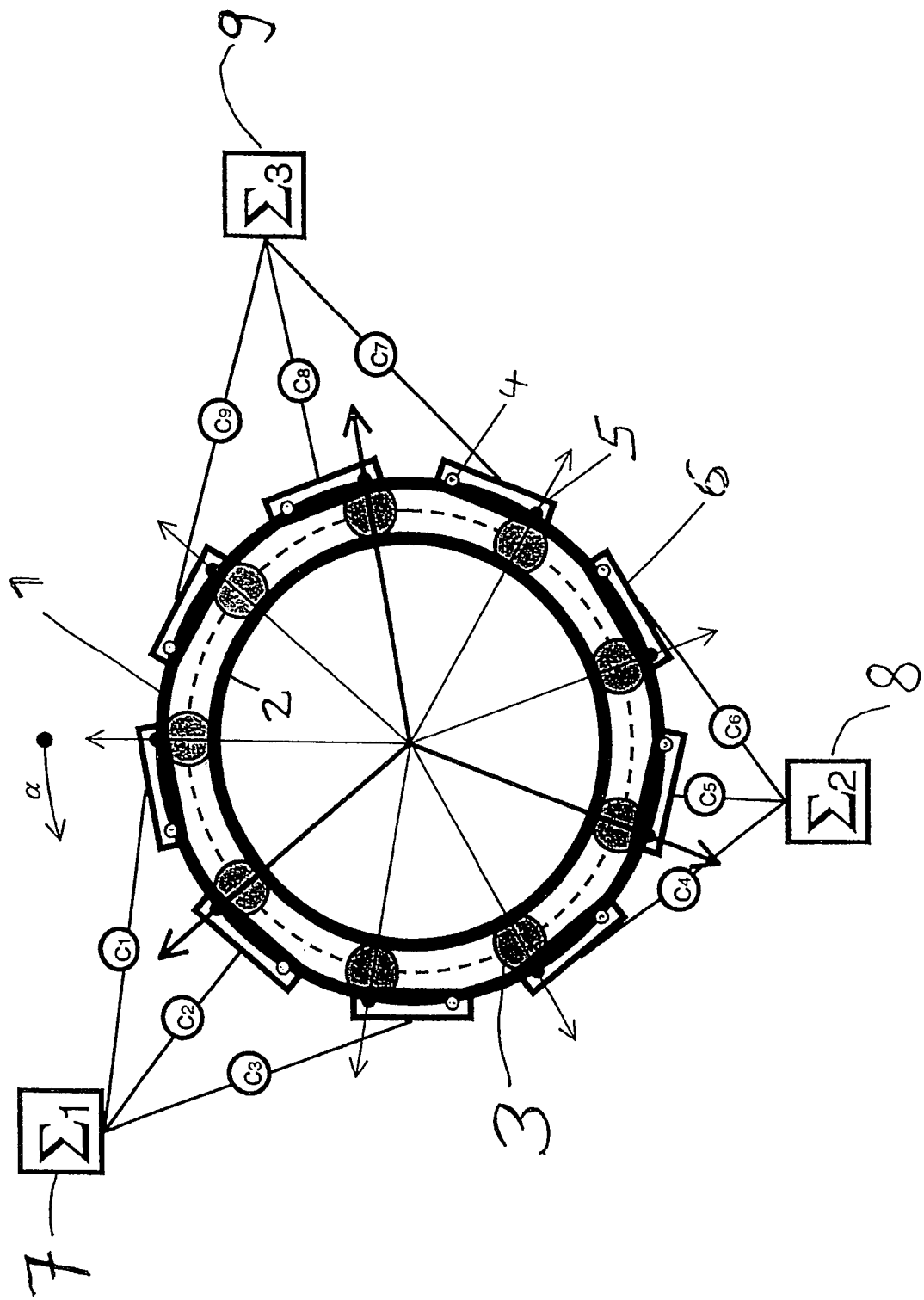

ROLLER BEARINGS EQUIPPED WITH SENSORS

CROSS-REFERENCE TO RELATED APPLICATIONS

This is a U.S. national stage application of PCT/DE03/01175 filed 10 Apr. 2003, which PCT application claims priority of German application number 102 15 929.7 filed 11 Apr. 2002. The PCT International application was published in the German language.

FIELD OF THE INVENTION

The present invention relates to antifriction bearings equipped with sensors, which are used in an extremely wide range of applications in order to measure the force acting on the antifriction bearings and the temperature

BACKGROUND OF THE INVENTION

Antifriction bearings equipped with sensors have the task of measuring the operating conditions present on the antifriction bearing, in order to then be able to control or regulate the overall process of the machine arrangement by using this measured data. In this case, antifriction bearings equipped with sensors are used for force measurement, measurement of the direction of rotation, rotational speed measurement and temperature measurement. Such antifriction bearings equipped with sensors are also disclosed, inter alia, in U.S. Pat. No. 5,952,587. The use of strain gage sensors, for example, and the evaluation of these measured results are extensively described in the text. The problem with the unit disclosed in this text is that, for antifriction bearings having a different number of antifriction elements, a different number of cables have to be led from the antifriction bearing to the evaluation unit located outside. The problem is therefore that the evaluation unit has to be designed differently, depending on the antifriction elements currently used in the antifriction bearings.

OBJECT OF THE INVENTION

There is, therefore, the object of proposing an evaluation unit for anti-friction bearings equipped with sensors which can be used independently of the number of antifriction elements in the antifriction bearing.

SUMMARY OF THE INVENTION

This object is achieved by the features in the invention. An antifriction bearing is equipped with sensors for measuring the length change in the rolling contact between antifriction elements and the outer ring. Region vectors are formed and pass via an interface to an evaluation unit disposed outside the antifriction bearing which add region vectors from the sensors in at least three regions and determines magnitude and direction of force on the bearing.

The invention comprises introducing a standardized interface between the antifriction bearing and the evaluation unit. This standardized interface makes it possible always to provide the same information at the interface, irrespective of the number of antifriction elements in the antifriction bearing. This is achieved by the antifriction bearing being subdivided, for example, into three regions, each covering 120°. All the sensors which lie within a subdivided, e.g. 120 degree, region are evaluated by an ASIC disposed on the antifriction bearing, so that the result is a force vector in this region. In this case, a region ASIC carries out a vector addition of the individual vectors which are determined by the sensors, in order to form an overall vector. The force vectors from the three region ASICs are therefore continuously present at the interface between the antifriction bearing and the evaluation unit. Each of the three ASICs therefore transmits an item of information which contains the magnitude of the force and the direction of the force in the respective region. In the evaluation unit, these three region vectors are then added vectorially and a vector which corresponds to the total loading of the antifriction bearing is thus determined.

The antifriction bearing may be divided up into four regions of 90 degrees each. The difference as compared with the three region embodiment is that here four region ASICs are used, which determine the force vector (magnitude and direction). Otherwise, the further procedure corresponds to that described above.

DESCRIPTION OF THE DRAWING

The invention is illustrated in FIG. 1 showing a side view schematically shows of an antifriction bearing.

An antifriction bearing incorporating the invention is conventionally comprised of an outer ring 1, an inner ring 2 spaced radially inward of the outer ring and antifriction elements 3 between the rings. Here, nine antifriction elements are shown in the example. On the outer ring 1, sensors 4, 5 are disposed, which are shown schematically. The sensors are disposed in a groove in the outer ring while the groove opens to the annular space between the rings. The sensors 4, 5 are disposed such that the sensor spacing corresponds to half the distance between two adjacent antifriction elements. In this illustration, the sensor 5 is currently situated on the outer ring and through the groove in the outer ring is directly in rolling contact with the antifriction element below the sensor, while the sensor 4 is situated precisely between two antifriction elements. The sensors 4 and 5 together constitutes a strain gage half bridge 6. Two further sensors, which are used for the temperature compensation of the two sensors 4 and 5, are disposed outside the loading zone of the antifriction bearing. Likewise disposed in the groove in the antifriction bearing is the region ASIC which adds up the results (from the three antifriction elements in the drawing of an example, each of the respective strain gage half bridge) for one region of 120 degrees. The current angular position in the 120 degree region is passed on to the region ASIC via the factors c1, c2 and c3 for region 1, and also c4, c5 and c6 for region 2 and c7, c8 and c9 for region 3. c1 to c9 are scalars which correspond to the angular position of the individual sensors in a region. The region ASICs then form the region vector 7, 8, 9 from the measured values. These region vectors (magnitude and direction) 7, 8, 9 are transmitted to the evaluation unit via a defined interface.

The invention claimed is:
1. An antifriction bearing comprising:
an inner bearing ring;
an outer bearing ring spaced outward from and extending around the inner bearing ring;
rolling antifriction elements in rolling contact with the inner and the outer rings;
sensors at locations around the rings for determining length changes in the rolling contacts between the antifriction elements and one of the rings, wherein the sensors further comprise sensor units for determining the length change in the rolling contact for several of the antifliction elements over respective arcuate regions of the rings and the sensor units each are operable to define region vectors for the length changes of the rolling contacts in their respective regions;

an interface connected with the sensor units for receiving the region vectors from each of the sensor units; and an evaluation unit for evaluating the region vectors supplied by the interface for determining a condition of the bearing that is dependent upon the length change in the rolling contacts between the antifriction elements and the one ring.

2. The antifriction bearing of claim 1, wherein the one ring is the outer ring and the sensors are disposed at the outer ring.

3. The antifriction bearing of claim 2, further comprising an access device in the outer ring enabling access of the sensors to the antifriction elements between the rings.

4. The antifriction bearing of claim 1, wherein the evaluation unit is disposed outside the bearing.

5. The antifriction bearing of claim 1, wherein the sensor units are arrayed in three groups to provide at least three region vectors to the interface.

6. The antifriction bearing of claim 1, wherein the evaluation unit is operable to evaluate the region vectors from each of the sensors over a region of the one ring comprises an ASIC.

7. The antifriction bearing of claim 6, wherein the ASIC is disposed on the bearing and produces the region vector for the respective region.

8. The antifriction bearing of claim 7, wherein the region ASIC is operable to carry out a vector addition of individual vectors which are determined by the sensors in order to form an overall vector for the region.

9. The antifriction bearing of claim 8, wherein the ASICs and the interface are operable so that the region vectors from the three region ASICs are continuously present at the interface.

10. The antifriction bearing of claim 8, wherein each of the ASICs transmits an item of information containing the magnitude of the force and the direction of the force in the respective region.

11. The antifriction bearing of claim 10, wherein the evaluation unit is operable to add vectorially the region vectors from each of the regions and to provide a vector corresponding to the total loading of the antifriction bearing.

* * * * *